US008634297B2

(12) United States Patent
Mishra et al.

(10) Patent No.: US 8,634,297 B2
(45) Date of Patent: Jan. 21, 2014

(54) PROBING SPECIFIC CUSTOMER FLOW IN LAYER-2 MULTIPATH NETWORKS

(75) Inventors: Chandan Mishra, Sunnyvale, CA (US); Rohit Watve, Santa Clara, CA (US); Dinesh G. Dutt, Sunnyvale, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 12/916,763

(22) Filed: Nov. 1, 2010

(65) Prior Publication Data

US 2012/0106339 A1 May 3, 2012

(51) Int. Cl.
*H04W 84/12* (2009.01)

(52) U.S. Cl.
USPC ............ 370/235; 370/241; 370/252; 370/338

(58) Field of Classification Search
USPC .................................. 370/235, 241, 252, 338
See application file for complete search history.

(56) References Cited

U.S. PATENT DOCUMENTS

| | | | | |
|---|---|---|---|---|
| 2008/0304413 | A1* | 12/2008 | Briscoe et al. | 370/235 |
| 2009/0296588 | A1* | 12/2009 | Nishi et al. | 370/242 |
| 2011/0261696 | A1* | 10/2011 | Crisan et al. | 370/235 |
| 2011/0299402 | A1* | 12/2011 | Vobbilisetty et al. | 370/241 |
| 2011/0299406 | A1* | 12/2011 | Vobbilisetty et al. | 370/248 |
| 2012/0039331 | A1* | 2/2012 | Astigarraga et al. | 370/389 |
| 2012/0044944 | A1* | 2/2012 | Kotha et al. | 370/401 |
| 2012/0075999 | A1* | 3/2012 | Ko et al. | 370/238 |
| 2012/0106347 | A1* | 5/2012 | Allan et al. | 370/238 |
| 2012/0163164 | A1* | 6/2012 | Terry et al. | 370/221 |

OTHER PUBLICATIONS

Radia Perlman, "Rbridges: Transparent Routing," in Proc. IEEE INFOCOM, Mar. 2004.
Radia Perlman et al., "Rbridges: Base Protocol Specification," IETF Draft, Jan. 2009.
J. Touch et al., "Transparent Interconnection of Lots of Links (TRILL): Problem and Applicability Statement," RFC 5556, IETF, May 2009.

* cited by examiner

*Primary Examiner* — Charles C Jiang
*Assistant Examiner* — Deepa Belur
(74) *Attorney, Agent, or Firm* — Edell, Shapiro & Finnan, LLC (57) ABSTRACT

Techniques are provided to enable a switch in a layer-2 multipath network to determine connectivity of a path to a destination switch. At a source switch, user flow parameters are determined for user flow packets to be transported in the layer-2 multipath network to a destination switch. The sourced switch determines a number of hops from it to the destination switch based on the user flow parameters. Timestamping is activated for time-to-live expiry packets received at the source switch and for time-to-live expiry packets received at the destination switch. One or more probe packets having user flow parameters matching the user flow parameters of user flow packets are generated so that the probe packets use the same path taken by the user flow packets between the source switch and the destination switch. In addition, a time-to-live value corresponding to the number of hops from the source switch to the destination switch is included in a hop count field of the one or more probe packets. The time-to-live value distinguishes the one or more probe packets from user flow packets. The one or more probe packets are sent in the layer-2 multipath network from the source switch to the destination switch. Connectivity between the source switch and the destination switch is determined based on the one or more probe packets.

17 Claims, 5 Drawing Sheets

PROBING SPECIFIC CUSTOMER FLOW IN LAYER-2 MULTIPATH NETWORKS

TECHNICAL FIELD

The present disclosure relates to network performance analysis of multipath networks.

BACKGROUND

Network monitoring tools have been in use to monitor the performance of a network, e.g., wired networks. For example, one such network monitoring tool, known as "Ping", works over layer-3 devices.

Existing network monitoring tools for layer-2 protocols, such as Ethernet, are configured to operate when there is a single distinct forwarding path between any two nodes. There are other networking environments that have multiple possible paths between a source node and a destination node. Monitoring the performance of a multipath network has additional challenges since there are a plurality of paths that can be taken between a source node and a destination node.

DESCRIPTION OF EXAMPLE EMBODIMENTS

Overview

Techniques are provided herein to enable a switch in a layer-2 multipath network to determine connectivity of a path to a destination switch. At a source switch, user flow parameters are determined for user flow packets to be transported in the layer-2 multipath network to a destination switch. The sourced switch determines a number of hops from it to the destination switch based on the user flow parameters. Timestamping is activated for time-to-live expiry packets received at the source switch and for time-to-live expiry packets received at the destination switch. One or more probe packets having user flow parameters matching the user flow parameters of user flow packets are generated so that the probe packets use the same path taken by the user flow packets between the source switch and the destination switch. In addition, a time-to-live value corresponding to the number of hops from the source switch to the destination switch is included in a hop count field of the one or more probe packets. The time-to-live value distinguishes the one or more probe packets from user flow packets. The one or more probe packets are sent in the layer-2 multipath network from the source switch to the destination switch. Connectivity between the source switch and the destination switch is determined based on the one or more probe packets.

Example Embodiments

Figure 1:
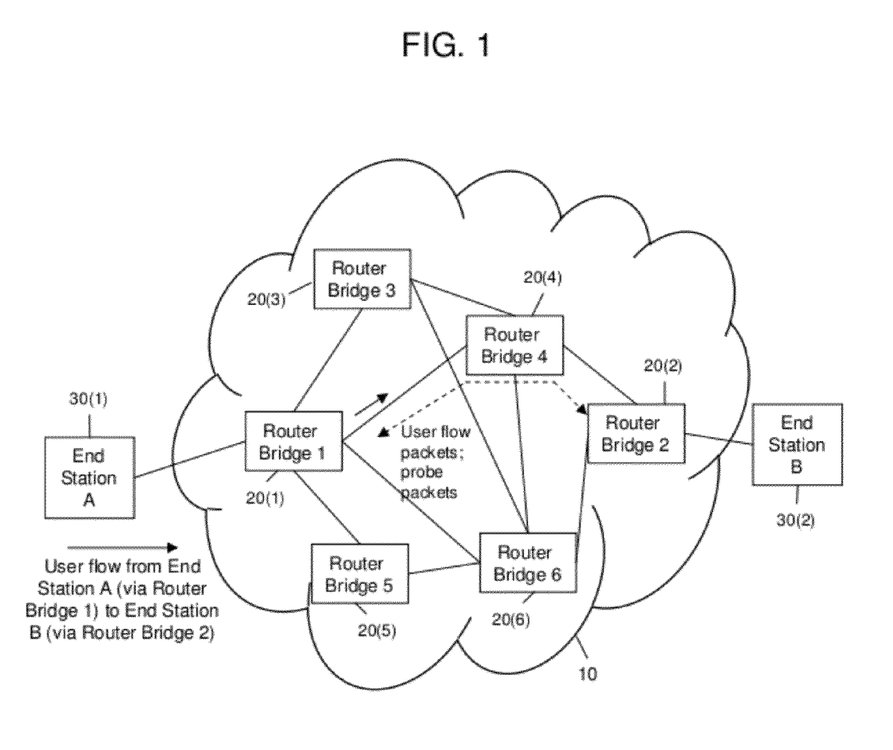
FIG. 1 is an example of a block diagram of a multipath network environment where a source router bridge (switch) is configured to generate probe packets from user flow parameters to test for connectivity to a destination router bridge (switch).

Referring first to FIG. 1, an example of a multipath network is shown at reference numeral 10. The network 10 is, for example, a Data Center Ethernet (DCE) network or a network that employs the Transparent Interconnect of Lots of Links (TRILL) protocol. The TRILL protocol is an Internet Engineering Task Force (IETF) Protocol implemented by devices called router bridges. To this end, there are router bridges 20(1)-20(6) in the simplified example network topology shown in FIG. 1. The router bridges 20(1)-20(6) are also referred to herein as switches. Also in this example, there is an end station A at 30(1) that is a source device of user flow packets to be sent to an end station B at 30(2) that is the destination device for the user flow packets. Router bridge 20(1) is the edge switch that is coupled to end station 30(1) and router bridge 20(2) is the edge switch that is coupled to end station 30(2). Thus, router bridge 20(1) serves as the source switch for a user flow and router bridge 20(2) serves as a destination switch for the user flow from router bridge 20(1). There are multiple paths in the network 10 between router bridge 20(1) and 20(2) as is readily apparent from FIG. 1. It should be understood that a real-world multipath network would have a much larger number of router bridges than those shown in FIG. 1. The number of router bridges shown in FIG. 1 is only by way of a simplified example for purposes of this disclosure.

Currently available network monitoring tools for layer-2 protocols such as Ethernet rely on algorithms such as the Spanning Tree Protocol (STP) to ensure the existence of only a single distinct forwarding path between any two nodes. However, since STP does not guarantee efficient utilization of all links available in the network, variants of IP protocols such as Intermediate System-Intermediate System (IS-IS) have been proposed to find multiple Equal Cost Multiple Paths (ECMPs) between any two nodes in DCE networks.

The TRILL protocol combines the advantages of bridges and routers and applies link state routing to virtual local area network (VLAN)-aware customer-bridges. Router bridges are compatible with existing IEEE 802.1 customer bridges as well as with IPv4 and IPv6 routers and end nodes. They are invisible to current IP routers and, like routers, router bridges terminate the bridge spanning tree protocol. TRILL capable devices (router bridges) run a link state protocol among each other to broadcast to all the router bridges, so that each router bridge knows about all the other router bridges, and the connectivity between them. Thus, router bridges have sufficient information to compute pair-wise optimal paths for unicast, and to calculate distribution trees for delivery of frames either to destinations whose location is unknown or to multicast/broadcast groups.

The link state routing protocol used in the TRILL protocol is IS-IS. IS-IS runs directly over layer-2, and therefore can run without the need to assign or configure IP addresses. Router bridges forward packets based on a header with a hop count. Router bridges also specify the next hop router bridge as the frame destination when forwarding unicast frames across a shared-media link. This prevents creation of additional copies of frames during a temporary loop. A Reverse Path Forwarding Check and other checks are performed on multi-destination frames to further control potentially looping traffic.

The router bridges shown in FIG. 1 are hardware (or software) configured to perform hashing computations on user flow data packets from a source to a destination to send the user flow packets on a specific one of a plurality of possible paths between the source and destination. A user flow is defined based on parameters in the data packet headers as described hereinafter. Thus, the particular path taken by the user flow packets will depend on parameters in the user flow data packet headers. Each of the switches shown in FIG. 1, for example switches 20(1) and 20(2), are configured to generate probe packets that have the same parameters of the user flow packets that are used to hash the path taken by the user flow parameters so that the probe packets follow the same path from the source switch to the destination switch as the user flow parameters. For example, Router Bridge 1 (i.e., switch 20(1)) generates probe packets from user flow parameters to test for connectivity to Router Bridge 2 (i.e., switch 20(2)). Consequently, a true measure of the network connectivity for a given user flow between a source switch and a destination switch can be determined from the probe packets.

For example, as shown in FIG. 1, end station 30(1) has data to send to end station 30(2). The user flow from end station 30(1) goes to switch 20(1). Based on certain parameters contained in the headers of the user flow data packets, the user flow data packets takes the path from switch 20(1) to switch 20(4) and then to switch 20(2) as shown by the dotted line in FIG. 1. The probe packets that switch 20(1) generates, according to the techniques described herein, also will take that same path via switch 20(4) to switch 20(2) so that switch 20(1) can measure the connectivity of that path from the probe packets.

Figure 2:
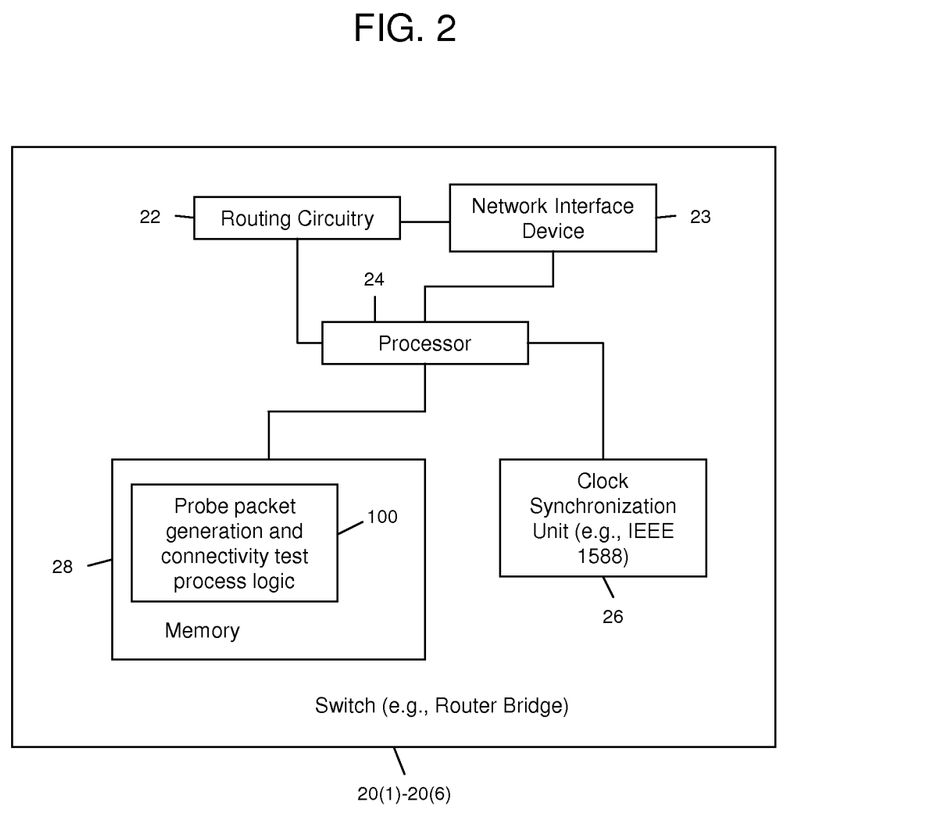
FIG. 2 is an example of a block diagram of a switch configured to generate probe packets from user flow parameters according to the techniques described herein.

Turning now to FIG. 2, an example of a block diagram of a switch that is configured to generate probe packets is now described. The diagram of FIG. 2 is representative of the general structure of any of the switches (router bridges) 20(1)-20(6) shown in FIG. 1. Each switch comprises routing circuitry 22, a network interface device 23 (e.g., Ethernet line card), a processor 24, a clock synchronization unit 26 and memory 28. The routing circuitry 22 is, in some examples, implemented by digital logic gates and related circuitry in an application specific integrated circuit (ASIC), and is configured to route packets through a network using a variety of protocols, such as the TRILL protocol referred to above. The network interface device 23 sends packets from the switch to the network and receives packets from the network that are sent to the switch. The processor 24 is, for example, a microprocessor, microcontroller, digital signal processor or other similar data processor configured for embedded applications in a switch.

The clock synchronization unit 26 is a device that is configured to timestamp packets that are sent and received by the switch. For example, the clock synchronization unit 26 is configured to operate in compliance with the IEEE 1588 standard for synchronizing clocks of devices across a network.

The memory 28 may comprise read only memory (ROM), random access memory (RAM), magnetic disk storage media devices, optical storage media devices, flash memory devices, electrical, optical, acoustical or other physical/tangible memory storage devices. The memory 28 stores executable software instructions for probe packet generation and connectivity test process logic 100. Thus, the memory 28 may comprise one or more computer readable storage media encoded with software comprising computer executable instructions and when the software is executed operable to perform the operations described herein for the process logic 100. The processor 22 executes the process logic 100 in order to generate and send probe packets and to test connectivity between a source switch (the switch that sends the probe packets) and a destination switch in a multipath network, such as the network 10 shown in FIG. 1.

Figure 3:
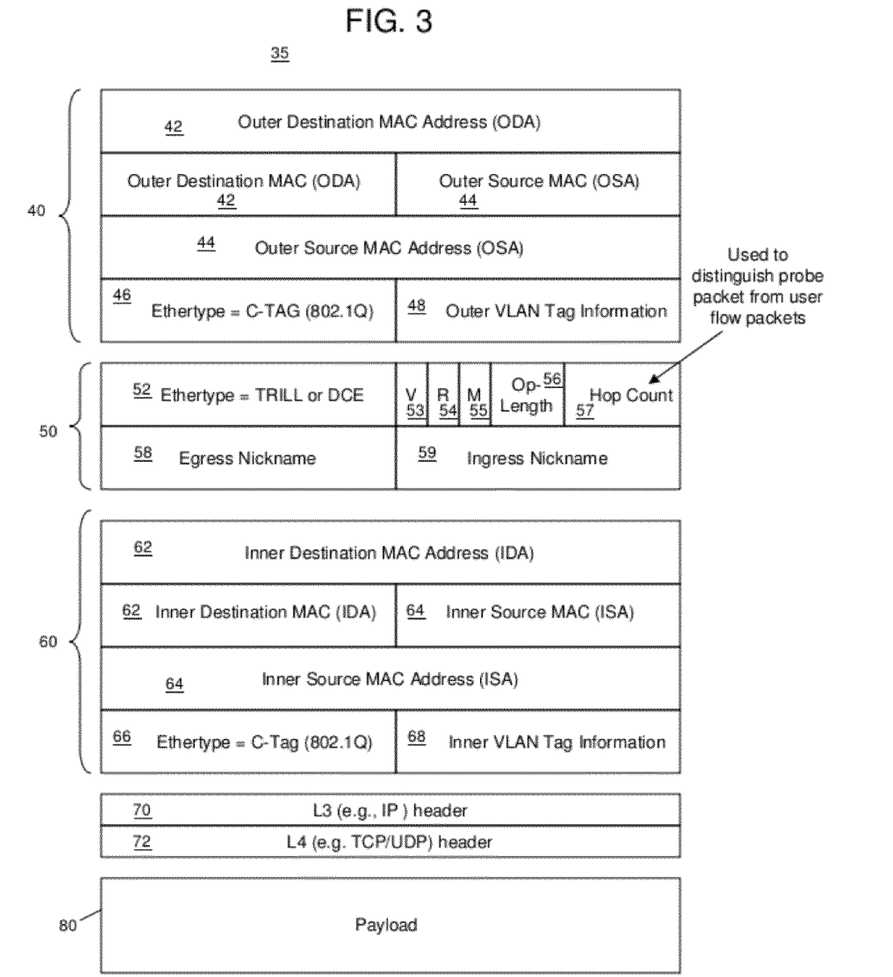
FIG. 3 is a diagram depicting an example of a format of user flow packets from which user flow parameters are derived and used in the probe packets.

Reference is now made to FIG. 3 that shows headers of user flow data packets that are to be routed through a multipath network such as the one shown in FIG. 1 and described herein. In networks that use DCE or TRILL routing protocols, packet forwarding is based on the outer switch address in the hierarchical media access control (MAC)-in-MAC header of the user flow data packets. FIG. 3 shows a structure of a packet 35 that is configured for routing using DCE or TRILL routing protocols. The packet 35 comprises an outer Ethernet header 40, a TRILL/DCE header 50, an inner Ethernet header 60 and a payload 70. The outer Ethernet header 40 is the aforementioned MAC-in-MAC header and comprises an outer destination MAC address (ODA) 42 for the destination switch and an outer source MAC address (OSA) 44 for the source switch. There is also a field 46 for the Ethertype and a field 48 for outer virtual local area network (VLAN) tag information. The Ethertype field is a two-octet field in an Ethernet frame, and is used to indicate which protocol is encapsulated in the payload of the Ethernet Frame, such as Internet Protocol, IEEE 801.1Q VLAN-tagged, and any of a number of protocols that can be encapsulated in an Ethernet frame. IEEE 802.1Q, or VLAN Tagging, is a networking standard promulgated by the IEEE 802.1 work group for the sharing of a physical Ethernet network link by multiple independent logical networks. IEEE 802.1Q defines a VLAN with respect to the bridging at the MAC layer and to the IEEE 802.1D spanning tree protocol. Thus, the IEEE 802.1Q protocol allows individual VLANs to communicate with one another through a network switch with Network layer (layer-3) capabilities, or a router. The outer VLAN tag information field 48 comprises bits that are used to identify the VLAN to which the frame belongs.

The first router bridge that a unicast frame encounters in a campus, e.g., router bridge 20(1), encapsulates the received frame with a TRILL header that specifies the last router bridge in the campus, e.g., router bridge 20(2), where the frame is decapsulated. Router bridge 20(1) is referred to as the "ingress router bridge" and router bridge 20(2) is referred as the "egress router bridge". To save room in the TRILL header and simplify forwarding lookups, a dynamic nickname acquisition protocol is run among the router bridges to select 2-octet nicknames for router bridges, unique within the campus, which are an abbreviation for the 6-octet IS-IS system identifier of the router bridge. The 2-octet nicknames are used to specify the ingress and egress router bridges in the TRILL header. The details of the packet headers are described further hereinafter in connection with FIG. 3.

The TRILL header 50 consists of 6 octets. The first 2 octets include a 6-bit decrementing hop count, plus flags, the next 2 octets contain the egress router bridge nickname, and the final 2 octets contain the ingress router bridge nickname. For multi-destination frames, the "egress router bridge nickname" specifies a distribution tree for the frame, where the nicknamed router bridge is the root of the distribution tree. The ingress router bridge selects which distribution tree the frame should travel along.

Although router bridges are transparent to layer-3 devices, and all the links interconnected by router bridges appear to layer-3 devices to be a single link, router bridges act as link routers in the sense that, in the forwarding of a frame by a transit router bridge, the outer layer-2 header is replaced at each hop with an appropriate layer-2 header for the next hop, and the hop count is decreased. Despite these modifications of the outer layer-2 header and the hop count in the TRILL Header 50, the original encapsulated frame is preserved, including the original frame's VLAN tag.

More specifically, as shown in FIG. 3, the TRILL/DCE header 50 comprises an Ethertype field 52, a Version (V) field 53, a Reserved (R) field, a Multi-destination (M) field 55, an Options Length (op-length) field 56, a hop count field 57, an egress nickname field 58 and an ingress nickname field 59. The Ethertype field 52 is similar to the Ethertype field 46 in the outer header 40. It indicates TRILL or DCE for TRILL or DCE based routing. The V field 53 is used to track compatibility with different versions of a protocol. The R field 54 is a reserved field for future extensions to a protocol. The M field 55 is a field to indicate that the frame is to be delivered to a class of destination end stations via a distribution tree that the egress router bridge nickname field specifies. The op-length field 56 is a field allocated to express in the header 50 that a frame is using an optional capability and to encode information into the header for that capability. The hop count field 57 is a field to store a hop count value. In accordance with the techniques described herein, the hop count field 57 will be used to store a particular value depending on the number of hops determined to be present on the user flow path from the source switch to the destination switch. A TTL value is set to a hop count between source switch and destination switch to distinguish probe packet from user flow packets. This is described further hereinafter. The egress and ingress nickname fields 58 and 59 are dynamically assigned quantities that act as abbreviations for router bridges' IS-IS identifiers to achieve a more compact encoding and to potentially specify different trees with the same route.

The inner Ethernet header 60 comprises an inner destination MAC address (IDA) field 62, an inner source MAC field 64, an Ethertype field 66 and an inner VLAN tag information field 68. The Ethertype field 66 and an inner VLAN tag information field 68 are similar to fields 46 and 48 in the outer header 40.

There is an inner field for a layer-3 (L3) header shown at 70 and for a layer-4 (L4) header shown at 72. The L3 header 70 includes inner source and destination IP addresses and the L4 header 72 includes information identifying source and destination Universal Datagram/Transport Control Protocol (UDP)/TCP ports.

As explained above, when a packet is routed in a multipath network that uses the DCE or TRILL protocol, the packet is forwarded along a particular path based on parameters obtained from the headers of the packet. For example, an ECMP hash computation to determine a path depends on the inner source MAC address and inner destination MAC address (the values of fields 62 and 64 shown in FIG. 3), the Ethertype field 66 for layer-2 packets or the inner IP address of field 70 and UDP/TCP ports of field 72 for layer-3/layer-4 packets. It is desired to test connectivity between a source switch and destination switch using the same user flow parameters (MAC addresses, IP addresses, Ethertype, UDP/TCP ports) that are used in the hash computation for the user flow data packets. Thus, the probe packets will have the same values for the user flow parameters (MAC addresses, IP addresses, Ethertype, UDP/TCP ports) as those contain in a given user flow so that the probe packets, when a hash computation is performed on them to determine the path to the destination switch, follow the same path as the user flow packets.

In addition, the probe packets used for testing connectivity need to be distinguishable from the user flow data packets. In accordance with one example, the probe packets are distinguished from the user flow data packets by setting the value of the hop count field 57 to a time-to-live value equal to the number of hops determined between the source switch and the destination switch, as described further hereinafter.

Figure 4:
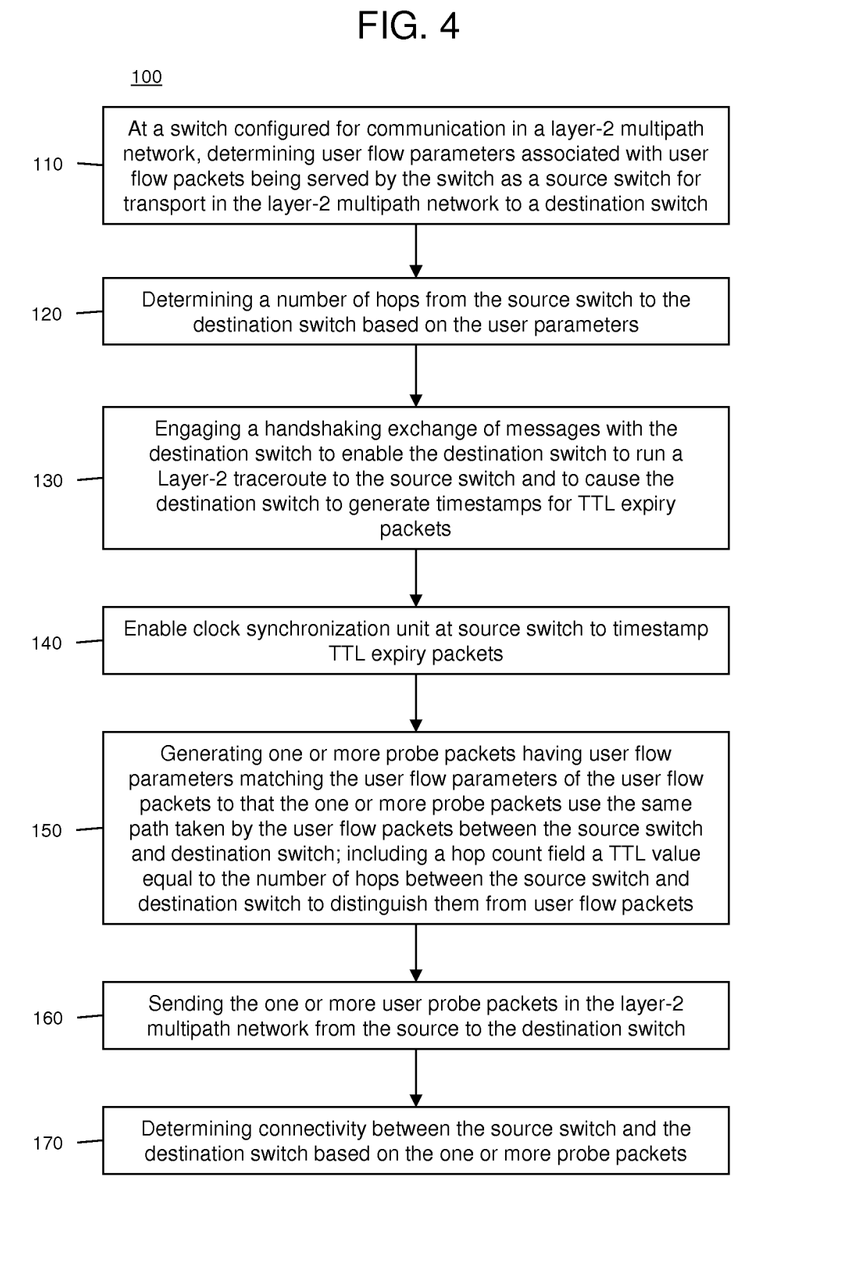
FIG. 4 is an example of a flow chart for a probe packet generation and connectivity test process performed in a switch to generate probe packets from user flow parameters and to test connectivity to a destination switch in a multipath network environment.

Reference is now made to FIG. 4 for a description of a flow chart depicting operations of the process logic 100 performed by a switch, acting as source switch with respect to a user flow to be sent to a destination switch. At 110, at a switch configured for communication in a layer-2 multipath network, user flow parameters are determined for user flow packets being served by the switch as a source switch (e.g., switch 20(1) in the example of FIG. 1) for transport in the layer-2 multipath network to a destination switch (e.g., switch 20(2) in the example of FIG. 1). Operation 110 thus involves reading the content of certain fields in the headers of a packet as described above in connection with FIG. 3, i.e., those parameters used in a hashing computation to determine path routing in the layer-2 multipath network between a source switch and a destination switch. For example, operation 110 involves determining from user flow packets a MAC address of the source switch, a MAC address of the destination switch, Ethertype and Universal Data Program or Transport Control Protocol ports from a hierarchical MAC-in-MAC header of the user flow packets from which ECMP hash computations are made to determine a path in the layer-2 multipath network from the source switch to the destination switch.

At 120, the source switch determines the number of hops from it to the destination switch for the user flow based on the user flow parameters. There are several ways to determine the number of hops from the source switch to the destination switch. One technique is to employ any of the DCE/TRILL routing protocols, such as the IS-IS protocol, that is running in order to provide multipath route computation functionality. These protocols can also find the number of hops to a given switch because all path information is available locally. Thus, the number of hops may be determined by obtaining path information stored at the source switch (or any other switch in the network) that was obtained (e.g., by the source switch) using one or more protocols that determine the number of hops between two switches in the multipath network, i.e., between the source switch and the destination switch. If this information is not available at the local switch, e.g., source switch, and a best path computation is not based on a minimum number of hops to a destination switch, then a layer-2 traceroute can be employed.

For a layer-2 traceroute, a test packet using the same flow parameters as the user flow is sent with a TTL value equal to 1. When the TTL expires, an error message is received at the source device based on the test packet. The TTL value for test packets is incremented until the destination switch receives the test packet. Thus, according to this technique, the number of node hops is determined by sending test packets (configured with the user flow parameters so that they follow the same path as the user flow packets) with increasing TTL values until a test packet is received at the destination switch. The smallest TTL value of a test packet that is received at the destination packet is equal to the number of hops from the source switch to the destination switch.

The number of hops (hop count) between the source switch and destination switch, determined at operation 120 is included as a TTL value in hop count field 57 (FIG. 3) of probe packets (to be generated as described herein) so as to distinguish the probe backs from user flow data packets. DCE as well as TRILL packets carry a TTL value in the outer header 50. Normally, this TTL value is decremented at each layer-2 hop and the packet is discarded or redirected to a supervisor for further error handling, if the TTL reaches a value of 1. When a switch receives a packet with a TTL value of 1 or 0 (zero), the switch should send back a TTL expiry error message to the originating switch (to the switch corresponding to the outer source MAC address in the case of DCE or to the ingress bridge in the case of TRILL). Even if IS-IS or other protocols are employed such that there are some equal cost paths with different numbers of hops, the use of the user flow parameters in the test packet will ensure that the correct number of hops is determined for the user flow parameters. Therefore, when the hop count field 57 in a probe packet (that has the same flow parameters as the user flow packets) is set to a value corresponding to the hop count determined at operation 120, the probe packets will be directed only to the destination switch and will follow the exact same path as the user flow packets.

At 130, the source switch engages in a handshaking message exchange with the destination switch to enable the destination switch to run a layer-2 traceroute to the source switch with the same user flow parameters (such that source and destination fields are interchanged) and a TTL value for the layer-2 traceroute test packets is set to the hop count determined at operation 120 (and included in the hop count field). In addition, at 130, the handshaking exchange between the source switch and the destination switch causes the destination switch to timestamp TTL expiry packets.

At operation 140, the source switch activates or enables its clock synchronization unit 26 (FIG. 2) to activate timestamping of TTL expiry packets received at the source switch (from the destination switch). Thus, at this point, both the source switch and the destination switch are configured to timestamp any TTL expiry packets that they may receive from each other. As a result, whenever the source switch receives a packet (from the destination switch) with a TTL value matching the configured value (included in field 57 referred to above), it timestamps that packet using the clock synchronization unit 26. Likewise, whenever the destination switch receives a packet (from the source switch) with a TTL value matching the configured value, the destination switch also timestamps that packet. The timestamps are then used to evaluate the latency of the path between the source switch and destination switch, in both directions.

Figure 5:
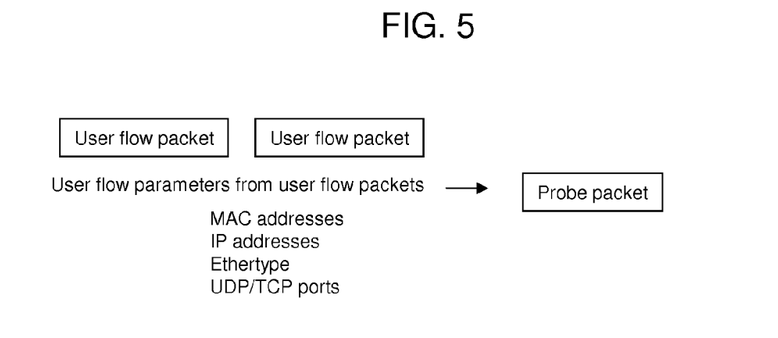
FIG. 5 is a diagram depicting the generation of probe packets from user flow packets at a switch.

At 150, the source switch generates one or more probe packets having user flow parameters matching the user flow parameters (that is, MAC addresses, Ethertype, UDP/TCP ports) of user flow packets so that the probe packets use the same path taken by the user flow packets between the source switch and the destination switch. In generating the one or more probe packets, a time-to-live field value is included in the hop count field 57 in header 50 that is equal to the number of hops from the source switch to the destination switch (determined at 120) and which value also distinguishes the one or more probe packets from user flow packets. FIG. 5 depicts the results of operations 110, 120 and 140 in ultimately generating probe packets from the user flow parameters derived from user flow packets.

Figure 6:
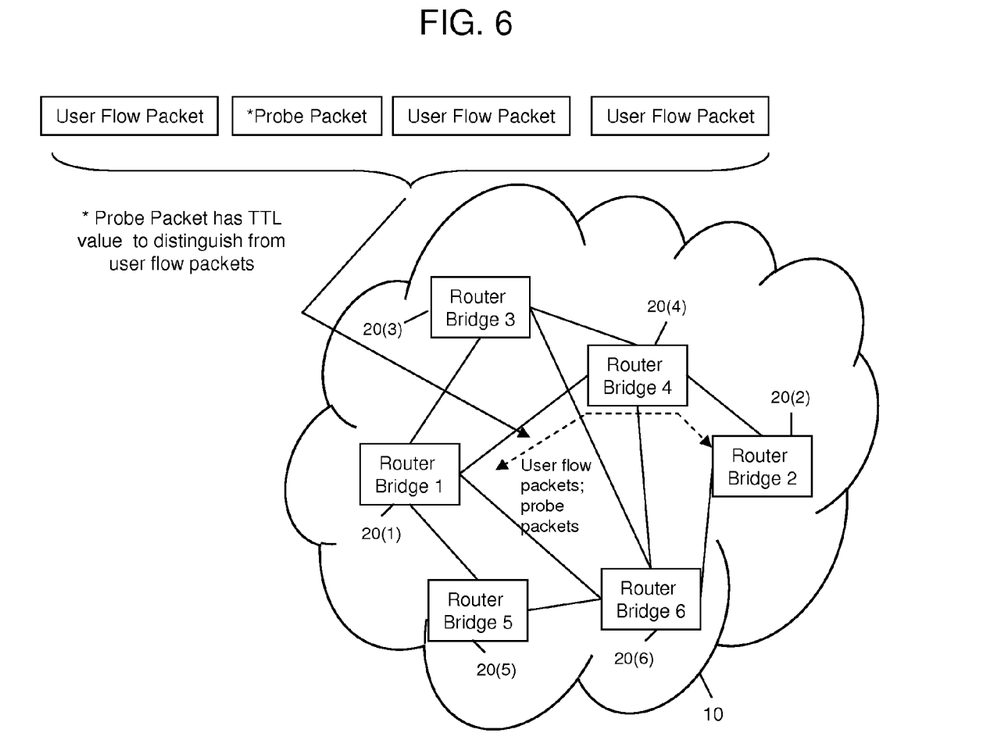
FIG. 6 is an example of a diagram illustrating the transmission of probe packets with the user flow parameters from the source switch to the destination switch.

At 160, the source switch sends the one or more probe packets in the layer-2 multipath network to the destination switch. The probe packets are sent on the same path as the user flow packets, but are distinguished from the user flow packets based on the TTL value inserted into the hop count field 57 in the header 50 as shown in FIG. 3. For example, if the number of hops along the path taken by the user flow packets is 6, then the TTL value inserted into hop count field 57 is the value 6. FIG. 6 shows how probe packets may be intermingled with user flow packets along the same path between the source switch and destination switch as the user flow packets.

At 170, based on the timestamped TTL expiry packets at the source switch and destination switch, the source switch and determine the connectivity (good connection or no/bad connection) between the source switch and the destination switch on the same path as the user flow packets based on the one or more probe packets. For example, if the probe packets are sent from the source switch to the destination switch and successfully reach the destination switch without any dropped packets (based on acknowledgment packets sent back to the source switch from the destination switch in response to receiving the probe packets), then the source switch determines that the path taken by the user flow packets is a good connection. In addition, at 170, the source switch can determine the latency (time period between a probe packet transmission and its reception at the destination switch) in the network using the timestamped probe packets received by the source switch and the destination switch. For example, the source switch receives information about the connectivity using TTL expiry response packets. The destination switch sends back packets with the same user flow parameters, but with the source and destination information fields exchanged. As a result, there are 4 timestamps available to the source switch, 2 in the forward direction (at the source switch and at the destination switch) and 2 in the reverse direction. These 4 timestamps allow the source switch to evaluate the path latency. In the case where the switches have time synchronization capabilities, 2 timestamps are also sufficient.

The operations 110-170 can be performed for each of a plurality of user flows that are sourced at any given switch and destined for any other switch in the multipath network 10 shown in FIG. 1. That is, a given switch may run these operations for multiple different users flows (to the same or different destination switches), and each user flow may result in a different path to the same destination switch and to a different destination switch. Thus, multiple sets of probe packets may be generated at a switch using the techniques described herein, where each set of probe packets dedicated to a particular user flow from one switch to any other switch.

The techniques described herein may be incorporated into the TRILL or DCE protocol specification and thus made part of the requirements of these protocols.

The above description is intended by way of example only.

What is claimed is:

1. A method comprising:

at a switch configured for communication in a layer-2 multipath network, determining user flow parameters from packets of a user flow that is to be carried through the layer-2 multipath network;

encapsulating by the switch the packets of the user flow into frames for transport to a destination switch in the layer-2 multipath network in accordance with one or more network protocols that enforce next hop addresses to be determined from the user flow parameters stored in packet header fields of the respective packets encapsulated by the frames;

determining a number of hops that forward the frames from the switch to the destination switch in accordance with the network protocols;

generating one or more probe packets having packet header fields matching the packet header fields of the user flow packets and storing therein flow parameters matching the user flow parameters;

encapsulating the probe packets into the frames so that the encapsulated probe packets traverse the path carrying the user flow;

storing the determined hop count in a hop count header field of the frame encapsulating the one or more probe packets to distinguish the encapsulated probe packets from the encapsulated user flow packets;

configuring the switch to timestamp time-to-live expiry packets received from the destination switch, and causing the destination switch to timestamp time-to-live expiry packets received from the switch;

sending the encapsulated probe packets through the layer-2 multipath network from the switch;

timestamping time-to-live expiry packets received at the switch and causing timestamping of time-to-live expiry packets received at the destination switch in response to sending the encapsulated probe packets;

measuring latency between the switch and the destination switch from timestamps in the timestamped time-to-live expiry packets generated at the destination switch and timestamps in the timestamped time-to-live expiry packets generated at the switch; and determining connectivity between the switch and the destination switch based on a response by the layer-2 multipath network to the sending of encapsulated probe packets.

2. The method of claim 1, wherein determining the number of hops comprises obtaining path information stored at the switch that is obtained using at least one of the network protocols that determine the number of hops between two switches in the multipath network.

3. The method of claim 1, wherein determining the number of hops comprises:

sending test packets with the user flow parameters with increasing time-to-live values stored in the hop count field until a test packet is received at the destination switch; and establishing the number of hops as equal to a smallest time-to-live value of the test packet that is received at the destination switch from the switch.

4. The method of claim 1, wherein determining the user flow parameters comprises selecting a set of the user flow parameters used by the network protocols to select the next hop in the layer-2 multipath network between the switch and the destination switch.

5. The method of claim 4, wherein determining the user flow parameters comprises selecting as the user flow parameters a media access control (MAC) address of a source of the user flow packets, a MAC address of a destination of the user flow packets, Ethertype and Universal Data Program or Transport Control Protocol ports from the packet header fields of the user flow packets from which Equal Cost Multiple Path (ECMP) hash computations are performed to determine the next hop address on the path in the layer-2 multipath network from the switch to the destination switch.

6. The method of claim 1, wherein causing the destination switch to timestamp further comprises engaging in a handshaking exchange with the destination switch to instruct the destination switch to run a layer-2 traceroute to the switch and causing the destination switch to generate timestamps for time-to-live expiry packets generated in response to the value stored in the hop count field of the encapsulated probe packets meeting a time-to-live threshold criteria specified by the network protocols on arrival to the destination switch.

7. The method of claim 1, wherein determining the user flow parameters, determining the number of hops, generating the probe packets, sending the probe packets and determining the connectivity are performed for each of a plurality of user flows entering the layer-2 multipath network at the switch.

8. An apparatus comprising:

a network interface device configured to enable communications over a layer-2 multipath network;

routing circuitry configured to forward packets over the layer-2 multipath network, including user flow packets from a source switch to a destination switch;

a processor communicatively coupled to the network interface device, to the routing circuitry, the processor configured to:

determine user flow parameters from packets of a user flow that is to be carried through the layer-2 multipath network;

encapsulate by the source switch the packets of the user flow into frames for transport to the destination switch in the layer-2 multipath network in accordance with one or more network protocols that enforce next hop addresses to be determined from the user flow parameters stored in packet header fields of the respective packets encapsulated by the frames;

determine a number of hops that forward the frames from the source switch to the destination switch in accordance with the network protocols;

generate one or more probe packets having packet header fields matching the packet header fields of the user flow packets and storing therein flow parameters matching the user flow parameters;

encapsulate the probe packets into the frames so that the encapsulated probe packets traverse the path carrying the user flow;

store the determined hop count in a hop count field of the frame encapsulating the one or more probe packets to distinguish the encapsulated probe packets from the encapsulated user flow packets;

configure the source switch to timestamp time-to-live expiry packets received from the destination switch, and cause the destination switch to timestamp time-to-live expiry packets received from the switch;

supply the encapsulated probe packets to the network interface device for transport through the layer-2 multipath network from the source switch to the destination switch;

timestamp time-to-live expiry packets received at the source switch and cause timestamping of time-to-live expiry packets received at the destination switch in response to sending the encapsulated probe packets;

measure latency between the source switch and the destination switch from timestamps in the timestamped time-to-live expiry packets generated at the destination switch and timestamps in the timestamped time-to-live expiry packets generated at the source switch; and determine connectivity between the source switch and the destination switch based on a response by the layer-2 multipath network to sending the encapsulated probe packets.

9. The apparatus of claim 8, wherein the processor is configured to:

generate test packets with the user flow parameter with increasing time-to-live values stored in the hop count field until a test packet is received at the destination switch; and establish the number of hops as equal to a smallest time-to-live value of the test packet that is received at the destination switch from the source switch.

10. The apparatus of claim 8, wherein the processor is configured to determine the user flow parameters by selecting a set of the user flow parameters used by the network protocols to select the next hop in the layer-2 multipath network between the source switch and the destination switch.

11. The apparatus of claim 10, wherein the processor is configured to select as the user flow parameters a media access control (MAC) address of the source switch, a MAC address of the destination switch, Ethertype and Universal Data Program or Transport Control Protocol ports from a hierarchical MAC-in-MAC header of the user flow packets from which Equal Cost Multiple Path (ECMP) hash computations are performed to determine a path in the layer-2 multipath network from the source switch to the destination switch.

12. One or more tangible, non-transitory computer readable storage media encoded with software comprising computer executable instructions and when the software is executed operable to:
   at a switch configured for communication in a layer-2 multipath network, determine user flow parameters from packets of a user flow that is to be carried through the layer-2 multipath network;
   encapsulate by the switch the packets of the user flow into frames for transport to a destination switch in the layer-2 multipath network in accordance with one or more network protocols that enforce next hop addresses to be determined from the user flow parameters stored in packet header fields of the respective packets encapsulated by the frames;
   determine a number of hops that forward the frames from the switch to the destination switch in accordance with the network protocols;
   generate one or more probe packets having packet header fields matching the packet header fields of the user flow packets and storing therein flow parameters matching the user flow parameters;
   encapsulate the probe packets into the frames so that the encapsulated probe packets traverse the path carrying the user flow;
   store the determined hop count in a hop count header field of the frame encapsulating the one or more probe packets to distinguish the encapsulated probe packets from the encapsulated user flow packets;
   configure the switch to timestamp time-to-live expiry packets received from the destination switch, and cause the destination switch to timestamp time-to-live expiry packets received from the switch;
   send the encapsulated probe packets through the layer-2 multipath network from the switch;
   timestamp time-to-live expiry packets received at the switch and cause timestamping of time-to-live expiry packets received at the destination switch in response to sending the encapsulated probe packets;
   measure latency between the switch and the destination switch from timestamps in the timestamped time-to-live expiry packets generated at the destination switch and timestamps in the timestamped time-to-live expiry packets generated at the switch; and
   determine connectivity between the switch and the destination switch based on a response by the layer-2 multipath network to the sending of the encapsulated probe packets.

13. The one or more tangible, non-transitory computer readable storage media of claim 12, wherein the instructions that are operable to determine the number of hops comprise instructions that are operable to:
   send test packets with the user flow parameters with increasing time-to-live values stored in the hop count field until a test packet is received at the destination switch; and
   establish the hop count as a smallest time-to-live value of the test packet that is received at the destination switch from the switch.

14. The one or more tangible, non-transitory computer readable storage media of claim 12, wherein the instructions that are operable to determine user flow parameters comprise instructions that are operable to select a set of the user flow parameters used by the network protocols to select the next hop in the layer-2 multipath network between the switch and the destination switch.

15. The one or more tangible, non-transitory computer readable storage media of claim 14, wherein the instructions that are operable to determine user flow parameters comprise instructions that are operable to select as the user flow parameters a media access control (MAC) address of a source of the user flow packets, a MAC address of a destination of the user flow packets switch, Ethertype and Universal Data Program or Transport Control Protocol ports from the packet header fields of the user flow packets from which Equal Cost Multiple Path (ECMP) hash computations are performed to determine the next hop address on the path in the layer-2 multipath network from the switch to the destination switch.

16. The one or more tangible, non-transitory computer readable storage media of claim 12, wherein the instructions that are operable to cause further comprise instructions that are operable to cause the destination switch to timestamp by engaging a handshaking exchange with the destination switch to instruct the destination switch to run a layer-2 traceroute to the switch and to cause the destination switch to generate timestamps for time-to-live expiry packets generated in response to the value stored in the hop count field of the encapsulated probe packets meeting a time-to-live threshold criteria specified by the network protocols on arrival to the destination switch.

17. The one or more tangible, non-transitory computer readable storage media of claim 12, wherein the instructions that are operable to determine user flow parameters, determine a number of hops, generate the probe packets, send the one or more probe packets and determine connectivity are performed for each of a plurality of user flows entering the layer-2 multipath network at the source switch.

* * * * *